United States Patent [19]

Pavone

[11] Patent Number: 4,553,951
[45] Date of Patent: Nov. 19, 1985

[54] NON-SLIP PULLEY AND BELT DRIVE

[75] Inventor: Robert J. Pavone, South Windsor, Conn.

[73] Assignee: The Gerber Scientific Instrument Company, South Windsor, Conn.

[21] Appl. No.: 500,383

[22] Filed: Jun. 2, 1983

[51] Int. Cl.⁴ .................. F16H 7/02; G01D 15/16
[52] U.S. Cl. ............................ 474/148; 474/167; 474/268; 474/272; 346/139 A
[58] Field of Search ............ 474/148, 167, 237, 268, 474/272, 273; 33/1 M; 74/89.22; 346/139 R, 139 A

[56] References Cited

U.S. PATENT DOCUMENTS

| | | | |
|---|---|---|---|
| 2,770,517 | 11/1956 | Zabriskie | 346/139 A |
| 3,225,615 | 0/1965 | Little | 74/416 |
| 3,762,232 | 0/1973 | Muller | 474/117 |
| 4,419,823 | 12/1983 | Thorban | 33/1 M |

FOREIGN PATENT DOCUMENTS 4519782 of 0000 Japan ............................................ 1/1

Primary Examiner—Stephen J. Novosad
Assistant Examiner—Bruce M. Kisliuk
Attorney, Agent, or Firm—McCormick, Paulding & Huber

[57] ABSTRACT

In a belt and pulley system wherein motion is transferred between the two members, the belt is a metal belt having a pulley engaging face made of a relatively soft material and the pulley is one having a regular pattern of small hard protuberances, such as formed by knurling, on its belt engaging face which press into the soft metal of the belt to form permanent depressions arranged in a matching pattern which mesh with the protuberances to provide a positive slip-free motion transfer. The belt and pulley drive may be used advantageously in a device such as an X-Y plotter for accurately positioning, with good repeatability and fine resolution, an associated member driven in one coordinate direction by the metal belt driven in turn by the knurled pulley.

18 Claims, 5 Drawing Figures

4,553,951

NON-SLIP PULLEY AND BELT DRIVE

BACKGROUND OF THE INVENTION

This invention relates to belt and pulley drives and deals more specifically with such a drive wherein the transfer of motion between the pulley and the belt is made with interengaging elements on the belt and the pulley which assure a slip-free transfer. The invention still further relates to an associated method for producing such a slip-free belt and pulley drive system.

A non-slip drive arrangement is known from prior U.S. Pat. No. 3,225,615 which shows a belt and pulley system wherein a belt is trained around two pulleys each having a series of relatively large gear tooth type projections formed on its outer periphery and wherein the belt has a very thick layer of elastic material engageable with the pulleys. In use the gear teeth deform the elastic material of the belt and form depressions in the belt which receive the gear teeth of the pulley to reduce slippage between the belt and pulley.

The general object of this invention is to provide a nonslip belt and pulley drive system somewhat similar to that of the aforesaid U.S. Pat. No. 3,225,615 but which is significantly improved over the device of said patent to allow it to be used, for example, in machines, such as X-Y plotters, for accurately positioning, with extremely good repeatability and fine resolution, an associated member driven in one coordinate direction, with the drive also having other important characteristics such as low cost, low inertia, long life, easy installation and freedom from vibration.

Other objects and advantages of the invention will be apparent from the following description and the accompanying drawings.

SUMMARY OF THE INVENTION

The invention relates to a belt and pulley drive which may be used for example in driving a driven member in one coordinate direction, wherein the belt is a metal one having a face provided by a relative soft metal engaging the pulley and wherein the pulley has a belt engaging face having an array of small protuberances thereon arranged in a regular or irregular pattern and made of a metal harder than that of the pulley engaging face of the belt so that protuberances press into the softer belt metal and form therein permanent depressions arranged in a matching pattern which mesh with the pulley protuberances to provide a slip-free drive.

In more detail, the invention resides in the belt being one having a main body of steel and a thin plating of copper providing the soft metal forming the belt's engaging face and in the pulley being one wherein the belt engaging surface is formed of aluminum with the protrusions being formed on the pulley surface by knurling, etching or another procedure, followed by grinding, and with such protrusions being hard coated.

The invention also resides in a method for making a belt and pulley drive wherein the belt is a metal one having an initially smooth pulley engaging surface formed from a soft metal and wherein permanent depressions are made in the soft metal of the belt by an initial "run-in" procedure wherein the belt is driven by the knurled drive pulley, or other drive pulley treated to give its surface a regular pattern of protrusions harder than the soft belt metal, during which "run-in" procedure the drive pulley forms matching permanent depressions in the soft belt metal.

DETAILED DESCRIPTION OF THE PREFERRED EMBODIMENT

Figure 1:
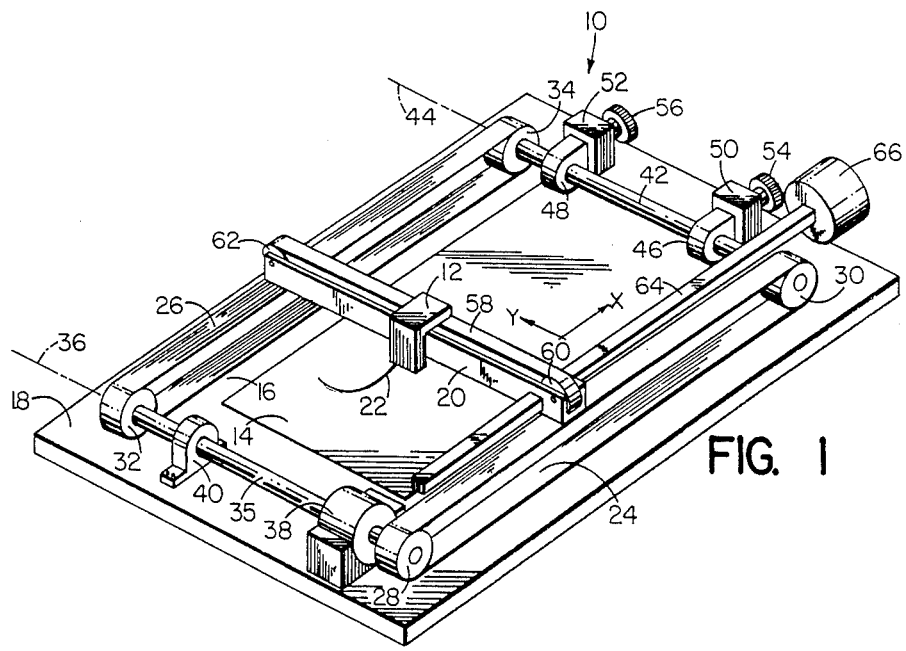
FIG. 1 is a schematic perspective view of an X-Y plotter having two belt and pulley drives each embodying the present invention.
Figure 2:
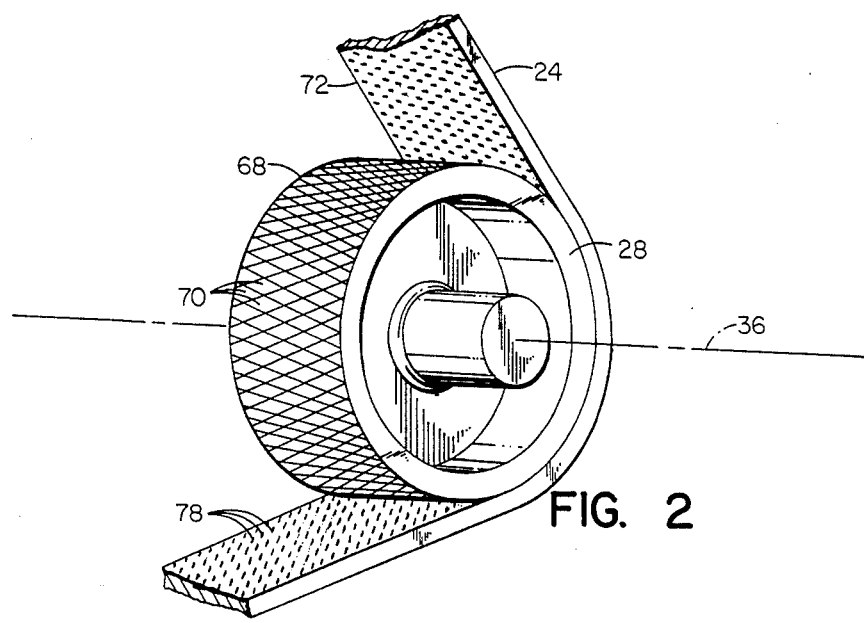
FIG. 2 is an enlarged fragmentary view showing the drive pulley and the associated belt of one of the belt and pulley drives of FIG. 1.
Figure 3:
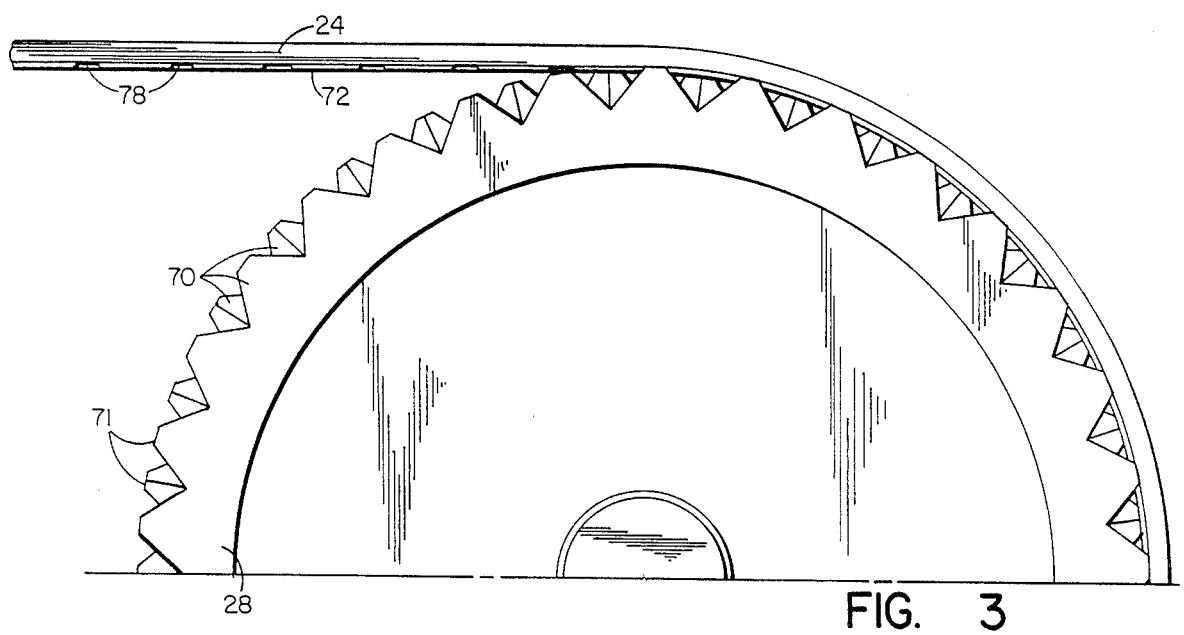
FIG. 3 is an enlarged fragmentary side elevational view of the belt and pulley of FIG. 2 with the size of the pulley protrusions relative to the remainder of the pulley being greatly exaggerated.

By way of example, FIG. 1 shows an X-Y plotter, indicated generally at 10, having two belt and pulley drives embodying the present invention for respectively driving a drawing head 12 in two different coordinate, or X and Y, directions relative to a sheet of paper 14 or the like supported by a horizontal flat supporting surface 16 provided by a table 18. In particular, the drawing head 12 is supported for movement in the Y-coordinate direction by an X-carriage 20. The X-carriage straddles the drawing surface represented by the paper 14 and is suitably supported by means not shown for movement in the X-coordinate direction. Therefore, by combined movement of the carriage 20 in the X-coordinate direction relative to the table and the drawing head 12 in its Y-coordinate dirction relative to the carriage 20, the drawing head 12 may be moved along any desired path relative to the paper 14 to draw a line such as that shown at 22.

For driving the X-carriage 20 in the X-coordinate direction the opposite ends of the X-carriage 20 are fixed to two belts 24 and 26 each trained over an associated pair of pulleys 28 and 30 or 32 and 34. The two pulleys 28 and 32 at the lefthand end of the table are drive pulleys and are fixedly supported on a drive shaft 35 driven about the transverse axis 36 by an X-drive motor 83 with the shaft 35 also being rotatably supported by a bearing 40 fixed to the table 18.

At the right-hand end of the table 18 the two pulleys 30 and 34 are fixed to a common transverse idler shaft 42 supported for rotation about a transverse axis 44 by two bearings 46 and 48. The bearings 46 and 48 are in turn adjustably supported from the table 16 by supports 50 and 52 having knobs 54 and 56 which may be rotated in one direction or the other to move the associated bearings 46 and 48 in the X-coordinate direction toward or away from the shaft 35 to control the tension in the belts 24 and 26. Each belt 24 and 26 has an upper and lower run extending in the X-coordinate direction and the opposite ends of the carriage 20 are fastened to the two upper runs. It should be noted that because of this attachment of the carriage 20 to the upper runs of the belts 24 and 26 the range of movement of the carriage 20 in the X-coordinate direction is limited to slightly less than the distance between the two pulley shafts 35 and 42, and each belt 24 and 26 has a length of slightly more than twice this distance. Therefore, in moving the carriage 20 back and forth in the X-coordinate direction within the allowed limited range of such movement it is assured that during the course of the rotation of either drive pulley 28 or 32 in one direction or the other a given point on its associated belt 24 or 26 will not pass over the drive pulley more than once.

Although two belts 24 and 26 are shown in FIG. 1 for driving the X-carriage 20, if desired only one belt may be used in some cases to provide such motion. Also, in FIG. 1 the pulleys 28, 30, 32 and 34 are all arranged for rotation about horizontal axes so that the width of each belt 24 and 26 extends in a horizontal direction, but if desired the pulleys could be made to rotate about vertical axes to have the width of the associated belts in turn extend in the vertical direction.

The Y-coordinate drive for the writing head 12 uses a single belt 58 trained about two pulleys 60 and 62 supported on opposite ends of the X-carriage 20. The pulley 60 is the drive pulley and is rotated by a spline shaft 64 driven by a Y-motor 66. Again, if desired, the two pulleys 60, 62 could be arranged with their axes of rotation vertical rather than horizontal as illustrated, in which case the width of the associated belt 58 would extend in the vertical rather than the horizontal direction. It will also be noted that similarly to the situation with the X-coordinate belts 24 and 26, during back and forth movement of the drawing head 12 within the limits of its Y-coordinate movement a given point on the belt 58 will never pass more than once over the drive pulley 60 while that pulley is rotated in one direction or the other.

All three belts 24, 26 and 58 and their associated drive pulleys 28, 32 and 60 of FIG. 1 embody the present invention and may be of substantially identical construction as shown in more detail by FIGS. 2 to 5. That is, FIGS. 2 to 5 by way of example show the construction of the drive pulley 28 and of the associated belt 24, and the other drive pulleys and belts may be of similar construction.

Figure 4:
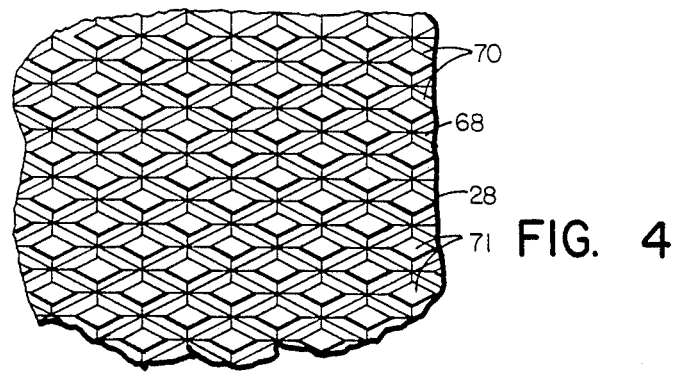
FIG. 4 is a development view of a portion of the surface of the pulley of FIGS. 2 and 3.

Referring to FIGS. 2 to 5, in accordance with the invention the drive pulley 28 has an outer generally cylindrical belt engaging surface 68 and this surface in turn has on it an array of small protuberances 70, 70 arranged in a regular pattern and which are made of a relatively hard metal. These hard metal protuberances may be provided in various different ways as for example by etching an initially smooth outer surface of a metal pulley with the metal being already hard at the time of the etching or hardening thereafter, or various different machining and/or deforming processes with or without subsequent hardening procedures may be used. At the present time the protuberances are preferably made by making at least the outer portion of the pulley 28, and preferably the entire pulley, of aluminum, forming an initially smooth outer surface on the pulley, knurling the smooth surface to form the protuberances 70, grinding the outer surface to form lands 71, 71 on the protuberances all of which are located in a common cylindrical surface concentric with the pulley's axis of rotation 36, and then hard coating the surface of the pulley, by well known chemical treatment, to harden the protuberances by forming an aluminum oxide or an aluminum oxide containing skin. The protuberances are quite small, and in keeping with this, the knurling is preferably a 30 diamond pattern knurling, as illustrated in FIG. 4, having a diametral pitch of between 64 and 160, with a diametral pitch of 96 being the presently preferred pitch.

Figure 5:
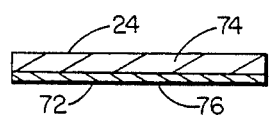
FIG. 5 is a cross-sectional view taken through the belt of FIGS. 2 and 3 prior to any depressions having been formed therein.

The belt 24 cooperating with the pulley 28 is a metal one having a pulley engaging face 72 made of a metal which, at least prior to the initial run-in of the belt with the pulley, is relatively soft. That is, it is substantially softer than the protuberances 70, 70 formed on the belt engaging surface 68 of the pulley. Various different metals may be used for the belt 24 but preferably, as shown in FIG. 5, the belt consists of a main body 74 providing the major strength element of the belt and a thin layer 76 providing the soft metal forming the pulley engaging surface 72. That is, the metal of the main body 74 has a yield strength substantially higher than that of the layer 76 and the metal of the layer 76 is in turn much softer than the metal of the main body 74. In the preferred case the metal of the main body 74 is stainless steel and the metal of the layer 76 is copper, the copper layer 76 preferably being plated to the main body 74. The width of the belt and the thicknesses of the main body 74 and the layer 76 may vary, but in one embodiment used by Applicant the band has a width of one and one-half inches with the main body 74 being a stainless steel one of 0.005 inch thickness and with the layer 76 being a copper plated one of about 0.001 inch thickness.

In the belt 24 of FIG. 5 the thin layer 76 of soft metal is provided only on the bottom surface of the main portion 74. If desired, another layer of soft metal can also be provided on the top surface of the main portion 74. In fact, where the soft material is constituted by a plated layer, such as a plated layer of copper, it may be easier to plate both the bottom and top surfaces of the stainless steel main portion than to plate only one of them. But, of course, in this case only one of the soft metal layers is used at a time to engage the knurled drive pulley.

As initially made the metal belt 24 has a smooth face 72 formed by the soft metal layer 76. In completing the drive system this belt, with its smooth face, is trained around the drive pulley, and any other associated pulley or pulleys, and the drive pulley and the belt are then "run-in" relative to one another for a given period of time by driving the drive pulley. During this "run-in" step a fair amount of tension is kept in the belt by properly adjusting the spacing between the drive and idler pulleys. As the "run-in" period progresses, the hard protuberances on the drive pulley press into the soft metal of the belt and form corresponding depressions 78, 78 in the belt which after their formation mesh with the protuberances to form a slip-free drive between the belt and the pulley. During the run-in period the idler pulley is progressively moved away from the drive pulley, to whatever extent is needed, to take up the slack in the belt which may occur as the depressions 78, 78 are formed by the pulley.

After the "run-in" of the belt and pulley the belt is uniquely matched to the pulley and thereafter a slip-free transfer of motion is had between the pulley and the belt to allow the belt to accurately position an associated driven member attached to it, such as the X-carriage 20 or the drawing head 12 of FIG. 1, with good repeatability and fine resolution. Moreover the drive system provided by the belt and pulley is one which may be made to have a low inertia, as by keeping the drive belt relatively thin and making the drive pulley of a lightweight material such as aluminum, and the drive system is furthermore one which is relatively easy to install, relatively economical to make and having a long service life. In the foregoing, the pulley and belt drive has been described in connection with an application wherein the pulley is a driving or powered member and has its motion transmitted through the belt to a non-powered or driven linearly movable member to move the linearly movable member back and forth along its path of movement. However, in other applications it is possible that the linearly movable member might be the powered or driving one and the belt used to transmit its motion to the pulley as the driven or non-powered member (as in U.S. Pat. No. 4,419,823), and the claims which follow are to be interpreted to include such reversal of function between the driving and driven parts.

I claim:

1. A drive for driving a driven member back and forth in one coordinate direction, said drive comprising: a driven member movable back and forth in one coordinate direction between first and second limits, a pair of pulleys spaced from one another in said coordinate direction and each rotatable about an axis perpendicular to said coordinate direction, one of said two pulleys being a drive pulley and the other an idler pulley, an endless metal belt trained about said two pulleys so as to have a first run extending along and parallel to said coordinate direction and a second return run, means for moving said two pulleys toward and away from one another along said coordinate direction so that their displacement from one another may be set to tension said belt and eliminate slack in both of said runs, means connecting said driven member to said belt along said first run, and means driving said drive pulley in either direction about its aforesaid axis to in turn drive said belt and said driven member, said drive of said metal belt as a result of said connection to it of said driven member being such that as said drive pulley is rotated in one direction or the other to move said driven member between said first and second limits of its movement in said one coordinate direction a given point on said belt will never pass over said drive pulley more than once and any part of said belt which passes over said drive pulley will not pass over said idler pulley, said metal belt comprising a main body made of one metal and a soft layer of another metal carried by said main body, said metal of said main body having a yield strength substantially higher than that of said soft layer and said metal of said main body being substantially harder than said metal of said soft layer, said soft layer having a face engaging said drive pulley, said face of said soft layer before said belt is initially trained over said two pulleys having a substantially smooth surface and said drive pulley having a circumferential face engaging said metal belt which drive pulley face has on it an array of small protuberances made of a metal harder than that of said soft layer of said belt so that said proturberances of said drive pulley, when said belt is first trained over said two pulleys and said drive pulley driven in both directions with said belt tensioned by said two pulleys, press into said smooth face of said softer metal of said belt and form therein permanent depressions arranged in an array matching that of said protuberances which mesh with said protuberances to thereafter provide a positive slip-free drive between said drive pulley and said belt with each depression of said belt always receiving the same proturberance of said pulley.

2. A drive as defined in claim 1 further characterized by said metal of said soft layer of said belt being copper.

3. A drive as defined in claim 1 further characterized by said metal of which said belt engaging face of said pulley is made being aluminum.

4. A drive as defined in claim 3 further characterized by said aluminum of which said belt engaging surface of said pulley is made being hard coated in the portion thereof providing said protuberances on said belt engaging surface.

5. A drive as defined in claim 1 further characterized by said metal of said soft layer of said belt being copper, and said metal forming said belt engaging face of said pulley being aluminum.

6. A drive as defined in claim 5 further characterized by said aluminum of said pulley being hard coated in the portion thereof providing said protuberances on said belt engaging surface.

7. A drive as defined in claim 1 further characterized by said protuberances on said pulley being protuberances formed by knurling said pulley face.

8. A drive as defined in claim 7 further characterized by said knurling of said belt engaging face of said pulley being a diamond pattern knurling.

9. A drive as defined in claim 8 further characterized by said diamond pattern knurling having a diametrical pitch of between 64 and 160.

10. A drive as defined in claim 1 wherein said metal of said main body of said belt is steel and said metal of said soft layer is copper.

11. A drive as defined in claim 10 further characterized by said layer of copper being a layer plated onto said main body of steel and which plated layer has a thickness of about 0.001 inch, said main body of said belt having a thickness of about 0.005 inch.

12. A drive as defined in claim 1 further characterized by said protuberances on said pulley being protuberances formed by knurling said pulley face followed by a grinding of said pulley face so that said protuberances have lands all located in a common cylindrical surface concentric to the axis of rotation of said pulley.

13. A method for making a drive for driving a driven member in one coordinate direction, said method comprising the steps of:

providing a drive member movable in one coordinate direction, providing a pair of pulleys each having a generally cylindrical outer surface adapted to engage a belt, processing the outer surface of one of said pulleys to form a plurality of small protuberances thereon located along the entire circumference of said one pulley, arranging said two pulleys in spaced relation from one another in said coordinate direction and supporting each of them for rotation about an axis perpendicular to said coordinate direction, providing a metal belt comprising a main body made of one metal and a soft layer of another metal carried by said main body, said metal of said main body having a yield strength substantially higher than that of said soft layer and said metal of said main body being substantially harder than said metal of said soft layer, said soft layer providing said belt with a substantially smooth face, training said belt over said two pulleys so that said smooth face of said soft metal layer engages said one pulley and so that at lease one run thereof extends along said coordinate direction, driving said one pulley back and forth in rotation about its axis of rotation so as to in turn drive said belt and at the same time adjusting the spacing between said two pulleys to maintain a tension in said belt to cause said small protuberances on the surface of said one pulley to press into said soft metal of said belt and form therein permanent depressions which thereafter mesh with said protuberances to provide a positive slip-free drive between said one pulley and said belt with each depression of said belt always receiving the same proturberance of said pulley, and thereafter using said one run of said belt to move said driven member along said coordinate direction by connecting said driven member to said one run of said belt and driving said belt by rotating said one pulley.

14. A method for making a drive for a driven member as defined in claim 13 wherein said step of processing said outer surface of said one pulley includes the substeps of knurling said outer surface to form said proturbances, and grinding said outer surface of said one pulley after said knurling step to form lands on said protuberances all located in a common cylindrical surface concentric with its axis of rotation.

15. A method for making a drive for a driven member as defined in claim 14 which method includes the step of hardening said outer surface of said knurled pulley after said grinding step is completed.

16. A method of providing a drive as defined in claim 15 further characterized by said knurled pulley being made of aluminum and said step of hardening said pulley comprising the step of treating said surface of said pulley chemically to form an aluminum oxide skin on said surface.

17. A non-slip drive for transferring motion between a first pulley and a drive belt in a system wherein said first pulley and drive belt move back and forth in opposite directions within end limits without any given point on said belt passing over said first pulley more than once while said first pulley is rotated in one direction and without the portion of the face of said belt which engages said first pulley engaging any outer pulley, said drive comprising: a first pulley such as aforesaid having a generally cylindrical outer metallic drive face and a metal belt trained over said pulley, means for tensioning said belt on said pulley, said pulley having small protuberances on its said outer face and said belt being one having a main body made of one metal and a soft layer of another metal carried by said main body, said metal of said main body having a yield strength substantially higher than that of said soft layer and said metal of said main body being substantially harder than that of said metal of said soft layer, said soft metal layer having a face engaging said pulley and said metal of said soft layer being softer than that of said pulley drive face, said face of said soft layer being substantially smooth prior to said belt being initially trained over said pulley whereby after said belt it trained on said pulley and said pulley rotated back and forth between its said end limits with said belt tensioned on said pulley by said tensioning means the protuberances on said outer face of said pulley press into said soft metal of said belt and form permanent depressions therein which thereafter mesh with said protuberances to provide a positive slip-free drive between said pulley and said belt with each depression of said belt always receiving the same protuberance of said pulley.

18. A non-slip drive as defined in claim 17 wherein said protuberances on said pulley face are ones formed by knurling.

* * * * *